(12) United States Patent
Shao et al.

(10) Patent No.: US 11,917,010 B2
(45) Date of Patent: Feb. 27, 2024

(54) METHODS AND INTERNET OF THINGS (IoT) SYSTEMS FOR GAS PURIFICATION MANAGEMENT IN STORAGE AND DISTRIBUTION STATION FOR SMART GAS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Guanghua Huang, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/066,246

(22) Filed: Dec. 14, 2022

(65) Prior Publication Data
US 2023/0111440 A1    Apr. 13, 2023

(30) Foreign Application Priority Data
Nov. 14, 2022  (CN) .......................... 202211416851.5

(51) Int. Cl.
*H04L 67/12* (2022.01)
*G16Y 10/35* (2020.01)
*G16Y 20/20* (2020.01)

(52) U.S. Cl.
CPC .............. *H04L 67/12* (2013.01); *G16Y 10/35* (2020.01); *G16Y 20/20* (2020.01)

(58) Field of Classification Search
CPC .......... H04L 67/12; G16Y 20/20; G16Y 10/35
See application file for complete search history.

(56) References Cited

U.S. PATENT DOCUMENTS 5,496,393 A  *  3/1996  Otsuka ................... B01D 46/46
422/119
2014/0123624 A1     5/2014  Minto
(Continued)

FOREIGN PATENT DOCUMENTS

| CN | 103984316 A |   | 8/2014 |
|----|-------------|---|--------|
| CN | 104807144 A | * | 7/2015 |

(Continued)

OTHER PUBLICATIONS

Chen et al., Control method and control device for combustion furnace in natural gas purification process, CN114427684A,2022, English translation downloaded from Espacenet on Jun. 8, 2023 (Year:2022) (Year: 2022).*

(Continued)

*Primary Examiner* — Arleen M Vazquez
*Assistant Examiner* — Lyudmila Zaykova-Feldman
(74) *Attorney, Agent, or Firm* — METIS IP LLC (57) ABSTRACT

The embodiments of the present disclosure provide a method and an Internet of Things (IoT) system for gas purification management in a storage and distribution station for smart gas. The method is implemented based on the IoT system for gas purification management in the storage and distribution station for smart gas. The IoT system includes a smart gas user platform, a smart gas service platform, a smart gas device management platform, a smart gas sensor network platform, and a smart gas object platform. The method is executed by the smart gas device management platform. The method includes: obtaining a gas quality condition parameter of a raw gas, and the gas quality condition parameter being obtained based on the storage and distribution station; determining, based on the gas quality condition parameter, an operation parameter in a purification (Continued)

process, the operation parameter being used for a purification operation of the raw gas.

4 Claims, 5 Drawing Sheets

(56) References Cited

U.S. PATENT DOCUMENTS

| | | | |
|---|---|---|---|
| 2015/0152791 A1 | | 6/2015 | White |
| 2019/0193017 A1* | | 6/2019 | Zhang ............... B01D 53/0446 |

FOREIGN PATENT DOCUMENTS

| | | | |
|---|---|---|---|
| CN | 105915581 A | | 8/2016 |
| CN | 106062341 A | | 10/2016 |
| CN | 109609225 A | * | 4/2019 |
| CN | 109609225 A | | 4/2019 |
| CN | 113426264 A | | 9/2021 |
| CN | 114427684 A | * | 5/2022 |
| CN | 114427684 A | | 5/2022 |
| CN | 115330361 A | | 11/2022 |

OTHER PUBLICATIONS

Li et al., A system for biogas purification of biomass gas, CN109609225A, 2019, English translation downloaded from Espacenet on Jun. 17, 2023(Year:2019) (Year: 2019).*

Chen et al., Cloud control platform of intelligent indoor air purification fresh air system based on Internet of Things, CN104807144A, 2015, English translation downloaded from Espacenet on Jun. 17, 2023 (Year:2015) (Year: 2015).*

"What is Natural Gas Purification", Web page <https://zhidao.baidu.com/question/395418666.html>, Jul. 14, 2020.

Wang, Zhengquan et al., Adaptability Simulation of Natural Gas Desulfurization Unit, Chemical Engineering of Oil & Gas, 2010, 7 pages.

Complete Technology of Natural Gas Purification Treatment, Science and Technology Management Department of China National Petroleum Corporation, 2016, 36 pages.

First Office Action in Chinese Application No. 202211416851.5 dated Dec. 30, 2022, 22 pages.

Notification to Grant Patent Right for Invention n Chinese Application No. 202211416851.5 dated Feb. 6, 2023, 3 pages.

Notification to Grant Patent Right for Invention in Chinese Application No. 202211416851.5 dated Feb. 6, 2023, 8 pages.

* cited by examiner

┌─────────────────────────────────────────────────────────────────┐
│ Obtaining a gas quality condition parameter of a raw gas, and the gas quality │ ⁓ 210
│ condition parameter being obtained based on the storage and distribution station │
└─────────────────────────────────────────────────────────────────┘
                                    ↓
┌─────────────────────────────────────────────────────────────────┐
│ Determining, based on the gas quality condition parameter, an operation parameter │ ⁓ 220
│ in a purification process, the operation parameter being used for a purification │
│ operation of the raw gas │
└─────────────────────────────────────────────────────────────────┘

METHODS AND INTERNET OF THINGS (IoT) SYSTEMS FOR GAS PURIFICATION MANAGEMENT IN STORAGE AND DISTRIBUTION STATION FOR SMART GAS

CROSS-REFERENCE TO RELATED APPLICATION

This application claims the priority of the Chinese application with the application No. 202211416851.5 filed on Nov. 14, 2022, the entire content of the above application is incorporated herein by reference.

TECHNICAL FIELD

The present disclosure relates to the field of gas purification, and in particular to a method and an Internet of Things (IoT) system for gas purification management in a storage and distribution station for smart gas.

BACKGROUND

In an actual production process, due to a presence of impurities such as hydrogen sulfide in a raw gas, the raw gas needs to be purified to avoid a blockage or corrosion of a gas pipeline caused by the impurities. However, the impurity content or purification content of the raw gas may change due to changes in a gas quality of an upstream gas well or changes in downstream demand, or temperature changes, etc.

Therefore, it is hoped to provide a method and an Internet of Things system for gas purification management in a storage and distribution station for smart gas, which can timely determine a condition of the raw gas and process the raw gas in time, so that the purification process meets a purification requirement and saves an operation energy consumption at the same time.

SUMMARY

One or more embodiments of the present disclosure provide a method for gas purification management in a storage and distribution station for smart gas. The method is performed by a smart gas device management platform of an Internet of Things (IoT) system for gas purification management of a storage and distribution station for smart gas. The method includes: obtaining a gas quality condition parameter of a raw gas, and the gas quality condition parameter being obtained based on the storage and distribution station; and determining, based on the gas quality condition parameter, an operation parameter in a purification process, the operation parameter being used for a purification operation of the raw gas.

One or more embodiments of the present disclosure provide an Internet of Things (IoT) system for gas purification management in a storage and distribution station for smart gas. The IoT system includes: a smart gas user platform, a smart gas service platform, a smart gas device management platform, a smart gas sensor network platform, and a smart gas object platform. The smart gas service platform is configured to send an operation parameter to the smart gas user platform. The smart gas object platform is configured to obtain a gas quality condition parameter of a raw gas, and transmit the gas quality condition parameter of the raw gas to the smart gas device management platform through the smart gas sensor network platform. The smart gas device management platform is configured to determine, based on the gas quality condition parameter, the operation parameter in a purification process, the operation parameter being used for a purification operation of the raw gas; generate, based on the operation parameter, a remote control instruction and send the remote control instruction to the smart gas sensor network platform. The smart gas sensor network platform is configured to send the remote control instruction to the smart gas object platform for performing the purification operation.

One or more embodiments of the present disclosure provide a non-transitory computer-readable storage medium, when reading the computer instructions in the storage medium, a computer implements a method for gas purification management in a storage and distribution station for smart gas.

BRIEF DESCRIPTION OF THE DRAWINGS

The present disclosure will be further described by way of embodiments, which will be described in detail with reference to the accompanying drawings. These embodiments are not limiting, and in these embodiments, the same numbers refer to the same structures, wherein.

DETAILED DESCRIPTION

To illustrate the technical solutions of the embodiments of the present disclosure more clearly, the following briefly introduces the accompanying drawings used in the description of the embodiments. Obviously, the accompanying drawings in the following description are only some examples or embodiments of the present disclosure. For those skilled in the art, without creative efforts, the present disclosure may further be applied to other similar scenes according to these drawings. Unless obviously obtained from the context or the context illustrates otherwise, the same numeral in the drawings refers to the same structure or operation.

It is to be understood that "system", "device", "unit" and/or "module" as used herein is a method used to distinguish different components, elements, parts or assemblies at different levels. However, these words may be replaced by other expressions if they serve the same purpose.

Flowcharts are used in the present disclosure to illustrate operations performed by a system according to the embodiment of the present disclosure. It should be understood that the former or the latter operations may not be performed in order exactly. Instead, the various operations can be processed in reverse order or simultaneously. At the same time, other operations may be added to these procedures, or an operation or operations can be removed from these procedures.

Figure 1:
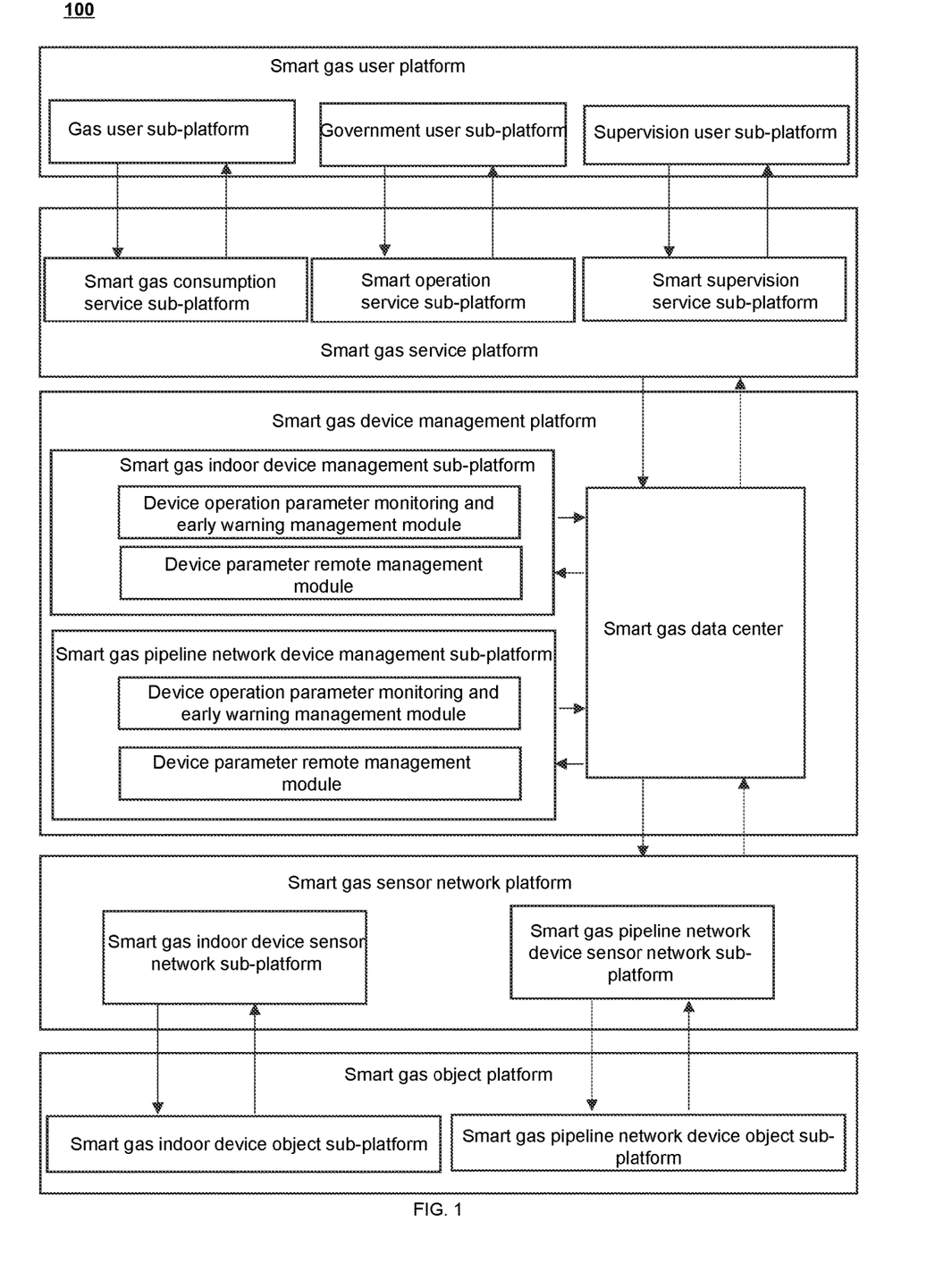
FIG. 1 is a schematic diagram illustrating an exemplary IoT system for gas purification management in a storage and distribution station for smart gas according to some embodiments of the present disclosure.

FIG. 1 is a schematic diagram illustrating an exemplary IoT system for gas purification management in a storage and distribution station for smart gas according to some embodiments of the present disclosure. In some embodiments, the IoT system 100 for gas purification management in the storage and distribution station for smart gas may include a smart gas user platform, a smart gas service platform, a smart gas device management platform, a smart gas sensor network platform, and a smart gas object platform.

The smart gas user platform is a platform that may be configured to interact with a user. In some embodiments, the smart gas user platform may be configured as a terminal device, for example, the terminal device may include a mobile device, a tablet computer, or the like, or any combination thereof. In some embodiments, the smart gas user platform may feedback information to the user through the terminal device. For example, the smart gas user platform may feedback an operation parameter in a purification process to the user through the terminal device.

In some embodiments, the smart gas user platform is provided with a gas user sub-platform, a government user sub-platform, and a supervision user sub-platform. The gas user sub-platform is oriented to the gas user to provide services related to a safe gas consumption. The gas user may refer to a user who uses gas, such as a consumer. In some embodiments, the gas user sub-platform may interact with the smart gas consumption service sub-platform to obtain the services related to the safe gas consumption.

The government user sub-platform is oriented to a government user to provide data related to a gas operation. The government user may refer to the user who performs the gas operation. In some embodiments, the government user sub-platform may exchange information with the smart operation service sub-platform to obtain the data related to the gas operation.

The supervision user sub-platform is oriented to a supervision user to supervise the operation of the entire IoT system 100 for gas purification management in the storage and distribution station for smart gas. The supervision user refers to the user of a security department. In some embodiments, the supervision user sub-platform may exchange information with the smart supervision service sub-platform to obtain services required by a safety supervision.

In some embodiments, the smart gas user platform may perform a two-way interaction with the smart gas service platform. For example, the smart gas user platform may issue an operation management information query instruction of a gas purification device (such as an operation parameter query instruction, etc.) to the smart gas service platform, and receive the operation management information of the gas purification device (such as operation parameters in the purification process, etc.) uploaded by the smart gas service platform. In some embodiments, the two-way interaction between the smart gas user platform and the smart gas service platform may include a two-way interaction between each sub-platform of the smart gas user platform and each sub-platform of the smart gas service platform.

The smart gas service platform may be a platform for receiving and transmitting data and/or information. The smart gas service platform may exchange data with the smart gas user platform and the smart gas device management platform. For example, the smart gas service platform may send the operation management information of the gas purification device to the smart gas user platform.

In some embodiments, the smart gas service platform is provided with a smart gas consumption service sub-platform, a smart operation service sub-platform, and a smart supervision service sub-platform. The smart gas consumption service sub-platform corresponds to the gas user sub-platform and provides the gas user with relevant information on the gas device. The smart operation service sub-platform corresponds to the government user sub-platform, and provides the government user with information related to the gas operation. The smart supervision service sub-platform corresponds to the supervision user sub-platform, and provides the supervision user with information related to the safety supervision.

In some embodiments, the smart gas service platform may interact mutually downward with the smart gas data center in the smart gas device management platform. For example, the smart gas service platform may issue the operation management information query instruction of the gas purification device to the smart gas data center; and receive the operation management information of the gas purification device uploaded by the smart gas data center.

The smart gas device management platform may refer to a platform configured to overall plan and coordinate the connection and cooperation between various functional platforms, and gather all the information of the IoT, and provide functions of the perceptual management and the control management for the IoT operation system. For example, the smart gas device management platform may receive a gas quality condition parameter of the raw gas, and determine, based on the gas quality condition parameter, the operation parameter in the purification process. As another example, the smart gas device management platform may predict, based on the operation parameter, energy consumption information corresponding to the operation parameter.

In some embodiments, the smart gas device management platform is provided with a smart gas indoor device management sub-platform, a smart gas pipeline network device management sub-platform, and the smart gas data center. In some embodiments, the smart gas indoor device management sub-platform and the smart gas pipeline network device management sub-platform may respectively interact with the smart gas data center in two-way. For example, the smart gas indoor device management sub-platform and the smart gas pipeline network device management sub-platform may respectively obtain and feedback management data from the smart gas data center. In some embodiments, the smart gas data center may aggregate and store all operation data of the system. In some embodiments, the smart gas device management platform may perform the information interaction with the smart gas service platform and the smart gas sensor network platform respectively through the smart gas data center. For example, the smart gas data center may receive the operation related data of the gas purification device uploaded by the smart gas sensor network platform (for example, the gas quality condition parameter of the raw gas), and send the data to the smart gas pipeline network device management sub-platform for processing, and then the summarized and processed data may be sent to the smart gas service platform.

In some embodiments, the smart gas indoor device management sub-platform and the smart gas pipeline network device management sub-platform may be provided with a device operation parameter monitoring and early warning management module and a device parameter remote management module. The device operation parameter monitoring and early warning management module may be configured to check historical data and real-time data of the gas device operation parameter, and perform monitoring and early warning according to a preset threshold. When the device operation parameter is abnormal, a manager may directly switch the device operation parameter monitoring and early warning management module to the device parameter remote management module, perform a remote processing on the device parameter, and send reminding information to the user through the smart gas service platform if necessary. The device parameter remote management module may be configured to remotely set and adjust the device parameter of the smart gas object platform, and remotely authorize the device parameter adjustment initiated by the smart gas object platform on site.

The smart gas sensor network platform may be a functional platform for managing a sensor communication. The smart gas sensor network platform may be configured as a communication network and gateway to realize functions such as a network management, a protocol management, an instruction management and a data analysis. In some embodiments, the smart gas sensor network platform may be connected to the smart gas device management platform and the smart gas object platform to realize the functions of a perceptual information sensing communication and a control information sensing communication. For example, the smart gas sensor network platform may receive operation related data of the gas purification device uploaded by the smart gas object platform; and issue an instruction to obtain the operation related data of the gas purification device to the smart gas object platform.

The smart gas object platform may be a functional platform for a perceptual information generation. In some embodiments, the smart gas object platform is provided with a smart gas indoor device object sub-platform and a smart gas pipeline network device object sub-platform. In some embodiments, the smart gas object platform may be configured as various types of gas device. For example, the gas device may include a gas purification device, a gas flow meter, a valve control device, a thermometer, a barometer, etc. In some embodiments, the smart gas object platform may perform a data interaction with the smart gas sensor network platform. For example, the smart gas object platform may upload the operation related data of the gas purification device to the smart gas sensor network platform.

It should be noted that the above description of the IoT system and its components is only to facilitate description, and does not limit the present disclosure to the scope of the illustrated embodiments. It can be understood that for those skilled in the art, after understanding the principle of the system, it is possible to arbitrarily combine the various components, or form a sub-system to connect with other components without departing from the principle. For example, the smart gas service platform and the smart gas device management platform may be integrated into one component. For another example, each component may share one storage device, and each component may also have its own storage device. Such deformations are all within the protection scope of the present disclosure.

Figure 2:
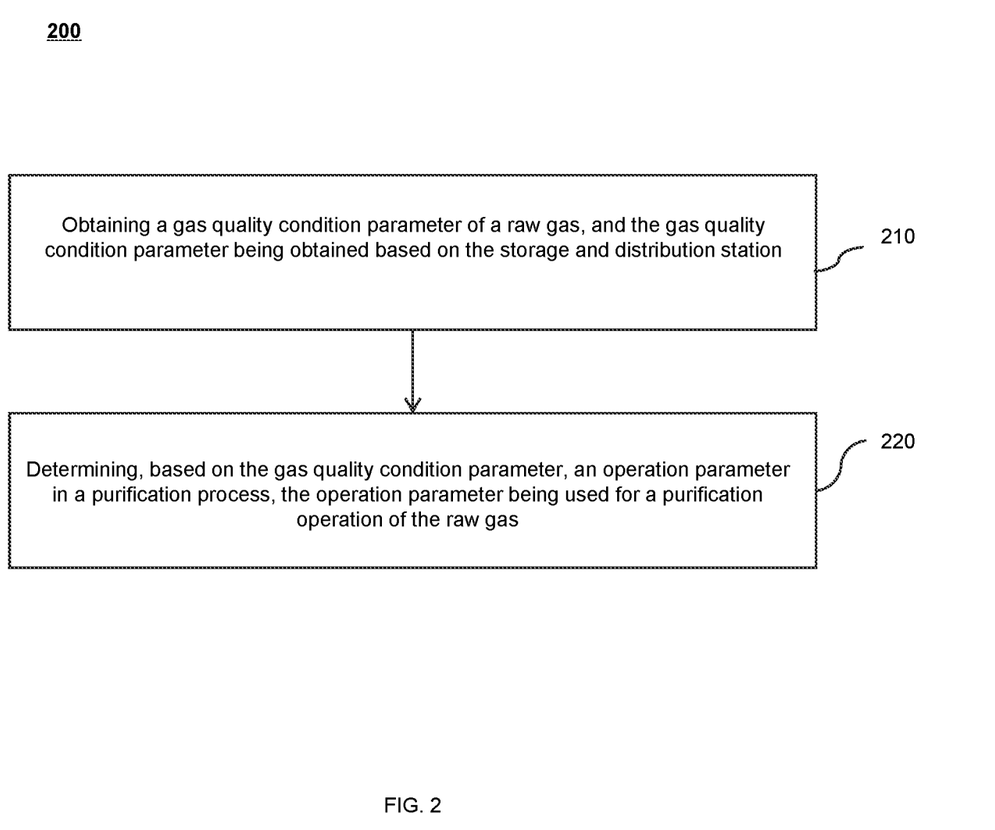
FIG. 2 is a flowchart illustrating an exemplary method for gas purification management in a storage and distribution station for smart gas according to some embodiments of the present disclosure.

FIG. 2 is a flowchart illustrating an exemplary method for gas purification management in a storage and distribution station for smart gas according to some embodiments of the present disclosure. As shown in FIG. 2, process 200 includes the following operations. In some embodiments, the process 200 may be performed by a smart gas device management platform.

Step 210, obtaining a gas quality condition parameter of a raw gas, and the gas quality condition parameter being obtained based on the storage and distribution station.

The raw gas refers to a raw gas delivered from the storage and distribution station to a gas purification device. Since the raw gas is not purified, impurities such as hydrogen sulfide and carbon dioxide contained in the raw gas may not meet a minimum requirement of the impurity content in the gas.

The gas quality parameter refers to a parameter that may reflect a gas quality feature of the raw gas. In some embodiments, the gas quality condition parameter may at least include one or more of a hydrogen sulfide content, a carbon dioxide content, and a target purification volume of the raw gas. The hydrogen sulfide content may refer to a mass of the hydrogen sulfide contained in each cubic meter of the raw gas. The carbon dioxide content may refer to a mass of the carbon dioxide contained in each cubic meter of the raw gas. The target purification volume may refer to the volume of the raw gas to be purified per day. For example, the gas quality condition parameter of a certain batch of the raw gas may be the hydrogen sulfide content of 14-15 $g/m^3$, the carbon dioxide content of 28-30 $g/m^3$, and the target purification volume of $300 \times 10^4$ $m^3/d$. In some embodiments, the gas quality condition parameter may further include a pressure of the raw gas, for example, the pressure is 4.0 MPa-6.0 MPa.

The storage and distribution station refers to a facility for storing and distributing gas in an urban gas transmission and distribution system. The storage and distribution station may transport the raw gas to the gas purification device to obtain a purified gas.

In some embodiments, the smart gas device management platform may obtain the gas quality condition parameter of the raw gas based on a corresponding metering device configured in the storage and distribution station. For example, the smart gas device management platform may use a gas flow meter to measure the target purification volume of the raw gas transmitted from the storage and distribution station to the gas purification device, or may use a hydrogen sulfide detector to measure the hydrogen sulfide content of the raw material gas transmitted from the storage and distribution station to the gas purification device, etc.

Step 220, determining, based on the gas quality condition parameter, an operation parameter in a purification process, the operation parameter being used for a purification operation of the raw gas.

The purification process refers to the process of purifying the impurities in the raw gas through the gas purification device. For example, when a purification category is a desulfurization, the purification process refers to the process of purifying the hydrogen sulfide in the raw gas with a gas desulfurization device. The gas desulfurization device is one type of the gas purification devices.

The operation parameter refers to the parameter in the process of purifying the raw gas. In some embodiments, the operation parameter may include at least one of an amine liquid circulation volume, an absorption tower temperature, and an amine liquid feeding location, etc.

The amine liquid circulation volume refers to a circulation volume of a weakly basic organic amine solvent used to absorb the hydrogen sulfide or the carbon dioxide per unit of time in the purification process. For example, the amine liquid circulation volume may be 40 $m^3/h$, etc. The weakly basic organic amine solvent may include monoethanolamine, diethanolamine, diisopropanolamine, etc. When other gas quality condition parameters of the raw gas and other operation parameters in the purification process remain unchanged, the amine liquid circulation volume may increase with an increase of the hydrogen sulfide content in the raw gas within a certain range, which is helpful for purifying the hydrogen sulfide in the raw gas.

The absorption tower temperature refers to the temperature of the device that implements an absorption operation in the purification process. For example, the absorption tower may be a plate tower, and the temperature of the absorption tower may be 30° C., etc. In some embodiments, changes of the absorption tower temperature may have a certain impact on the desulfurization operation. For example, when the absorption tower temperature is higher, the amine liquid circulation volume required to meet the purification requirement may increase. As another example, when the absorption tower temperature is lower, the amine liquid circulation volume required to meet the purification requirement may decrease. The smart gas device management platform may set the absorption tower temperature according to actual needs, and may heat or cool the absorption tower.

The amine liquid feeding location refers to the feeding location where the amine liquid is transmitted to the absorption tower during the purification process. Different amine liquid feeding locations correspond to different tray numbers of the absorption tower configured for the absorption operation, and different amine liquid feeding locations have different effects of removing the hydrogen sulfide and the carbon dioxide. For example, the amine liquid feeding location may include the 10th tray, 12th tray, 16th tray, etc. of the absorption tower. Different gas quality parameters may correspond to different amine liquid feeding locations. For example, when the hydrogen sulfide content is less than 15 g/m$^3$, the amine liquid feeding location may be at the 12th tray of the absorption tower. As another example, when the hydrogen sulfide content is greater than or equal to 15 g/m$^3$, the amine liquid feeding location may be at the 16th tray of the absorption tower. In some embodiments, when other gas quality condition parameters of the raw gas and other operation parameters in the purification process remain unchanged, different amine liquid feeding locations corresponds to different amine liquid circulation volumes.

In some embodiments, there may be a certain corresponding relationship between the gas quality condition parameter of the raw gas and the operation parameter in the purification process. The corresponding relationship may be set in advance. The smart gas device management platform may determine the operation parameter in the purification process based on the above corresponding relationship and the gas quality condition parameter of the raw gas.

In some embodiments, the smart gas device management platform may obtain the operation parameter in the purification process through an operation parameter prediction model. In some embodiments, the operation parameter prediction model may be a machine learning model, e. g., an artificial neural network model, a deep neural network model, a convolutional neural network model, etc. In some embodiments, an input of the operation parameter prediction model may include a gas quality condition parameter and a purification parameter. An output of the operation parameter prediction model may include the operation parameter in the purification process.

In some embodiments, the gas quality condition parameter may include one or more of the hydrogen sulfide content of the raw gas, the carbon dioxide content of the raw gas, the target purification volume, etc. In some embodiments, the purification parameter may include a purification category (such as a desulfurization purification, a decarbonization purification, etc.) in the purification process, a type of the gas purification device (such as the type of the gas desulfurization device, etc.), a purification standard (such as a standard value of the hydrogen sulfide content in the gas after desulfurization, etc.), etc.

In some embodiments, training data of the operation parameter prediction model includes a first training sample and a first label. The first training sample may be obtained based on the gas quality condition parameter and the purification parameter of the raw gas in a historical purification process. The first label is an actual operation parameter corresponding to the first training sample, and the first label may be obtained by manual labeling. The smart gas device management platform may input the first training sample and the first label into an initial operation parameter prediction model to determine a prediction result of the operation parameter. A loss function may be determined based on the prediction result of the operation parameter and the corresponding first label. The smart gas device management platform may update the parameter of the initial operation parameter prediction model based on the loss function until the training ends when the preset condition is met. The preset condition may be that the loss function converges, the number of iterations reaches a threshold, etc.

In some embodiments, the operation parameter in the purification process may further be obtained through a recommended operation parameter prediction model. The output of the recommended operation parameter prediction model may include at least one group of recommended operation parameters and at least one group of effect scores, and the at least one effect score may be used to determine at least one recommendation coefficient corresponding to the at least one group of recommended operation parameters. The smart gas device management platform may determine the operation parameter in the purification process based on the at least one group of recommended operation parameters and the at least one group of recommendation coefficients. For more contents about the recommended operation parameter prediction model, the recommended operation parameter and the recommendation coefficient, please refer to FIG. 3 and FIG. 5 and related descriptions thereof.

In some embodiments, the smart gas device management platform may generate a remote control instruction based on operation parameter. In some embodiments, the smart gas device management platform may send the remote control instruction to a smart gas sensor network platform. In some embodiments, the smart gas sensor network platform may send the remote control instruction to a smart gas object platform for performing the purification operation.

The remote control instruction refers to an instruction to remotely control the purification process and the operation parameter of the gas purification device during the purification process. For example, a remote control instruction may be to set the temperature of the absorption tower to 35° C., or to adjust the amine liquid feeding location to the 12th tray of the absorption tower.

Through sending remote control instruction to the smart gas sensor network platform by the smart gas device management platform, a real-time adjustment of the operation parameter of the gas purification device during the purification process can be achieved, thereby increasing a control over the purification process.

Through determining different operation parameters in the purification process corresponding to different gas quality condition parameters, most suitable purification schemes can be adopted for different raw gases, thereby improving the purification effect.

Figure 3:
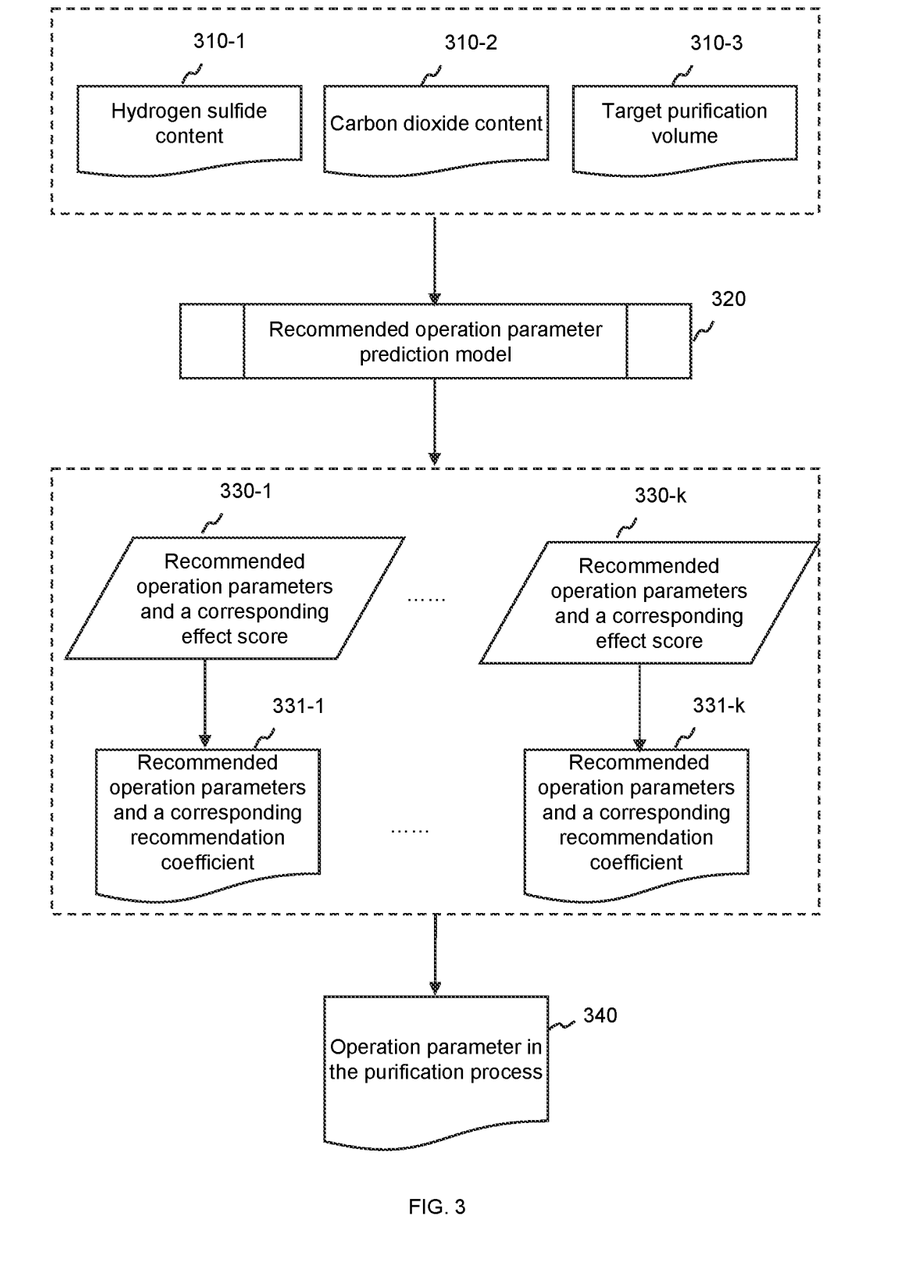
FIG. 3 is a schematic diagram illustrating an exemplary process of determining an operation parameter in a purification process according to some embodiments of the present disclosure.

FIG. 3 is a schematic diagram illustrating an exemplary process of determining an operation parameter in a purification process according to some embodiments of the present disclosure. In some embodiments, FIG. 3 may be performed by a smart gas device management platform.

In some embodiments, the smart gas device management platform may predict at least one group of recommended operation parameters and at least one effect score corresponding to the at least one group of recommended operation parameters through a recommended operation parameter prediction model based on one or more of a hydrogen sulfide content, a carbon dioxide content, and a target purification volume, and the at least one effect score is used to determine at least one recommendation coefficient corresponding to the at least one group of recommended operation parameters.

In some embodiments, the recommended operation parameter prediction model 320 may be configured to predict the at least one group of recommended operation parameters and the at least one effect score corresponding to the at least one group of recommended operation parameters based on one or more of the hydrogen sulfide content 310-1, the carbon dioxide content 310-2, and the target purification volume 310-3. In some embodiments, the recommended operation parameter prediction model 320 may be a machine learning model, for example, an artificial neural network model, a deep neural network model, a convolutional neural network model, etc.

In some embodiments, an input of the recommended operation parameter prediction model may include a gas quality condition parameter, e.g., the hydrogen sulfide content 310-1, the carbon dioxide content 310-2, and the target purification volume 310-3. In some embodiments, the input of the recommended operation parameter prediction model may further include a purification parameter. For more contents of the hydrogen sulfide content, the carbon dioxide content, the target purification volume, and the purification parameter, please refer to the relevant descriptions of FIG. 2.

In some embodiments, an output of the recommended operation parameter prediction model may include the at least one group of recommended operation parameters and the at least one effect score corresponding to the at least one group of recommended operation parameters. For example, the recommended operation parameters and the corresponding effect score may include k groups, that is, recommended operation parameters and a corresponding effect score 330-1, . . . , recommended operation parameters and a corresponding effect score 330-$k$, etc.

The recommended operation parameter refers to a better operation parameter predicted by the recommended operation parameter prediction model. The recommended operation parameter may be used to determine the final operation parameter in the purification process. For example, 3 groups of recommended operation parameters may be obtained through the recommended operation parameter prediction model. The first group of the recommended operation parameters includes an amine liquid circulation volume: 34 m³/h, a tray tower temperature: 30° C. and an amine liquid feeding location: at 10th tray of the absorption tower. The second group of the recommended operation parameters includes an amine liquid circulation volume: 36 m³/h, a tray tower temperature: 31° C., and an amine liquid feeding location: at 12th tray of the absorption tower. The third group of the recommended operation parameters includes an amine liquid circulation volume: 41 m³/h, a tray tower temperature: 32° C., and an amine liquid feeding location: at the 8th tray of the absorption tower.

The effect score may refer to a score value for evaluating a purification effect corresponding to the recommended operation parameter. In some embodiments, a group of the recommended operation parameters corresponds to an effect score. The effect score may be any real number value between 0 and 100. For example, the effect score corresponding to a group of the recommended operation parameters may be 80. The higher the effect score is, the better the purification effect with the corresponding recommended operations parameter is. In some embodiments, a higher effect score may indicate a lower impurity content in the gas purified by adopting the corresponding recommended operation parameter.

The recommendation coefficient refers to a recommendation value corresponding to the recommended operation parameter. The recommendation coefficient may be determined based on the effect score corresponding to the recommended operation parameter. In some embodiments, a group of recommended operation parameters corresponds to a recommendation coefficient. For example, the recommended operation parameters and the corresponding effect score 330-1 correspond to the recommended operation parameters and a corresponding recommendation coefficient 331-1, . . . , the recommended operation parameters and the corresponding effect scores 330-$k$ correspond to the recommended operation parameters and a corresponding recommendation coefficient 331-$k$, etc. The recommendation coefficient may be any real number value between 0 and 100. For example, the recommendation coefficient corresponding to a group of the recommended operation parameters may be 90.

In some embodiments, for each group of the recommended operation parameters, the effect score may be directly used as the recommendation coefficient. In some embodiments, for each group of recommended operation parameters, the effect score may be combined with energy consumption information (such as power consumption, material consumption, etc.) to determine the recommendation coefficient. For example, the smaller the power consumption and the material consumption corresponding to the recommended operation parameters are, the higher the recommendation coefficient corresponding to the recommended operation parameters is. The higher the effect score corresponding to the recommended operation parameters is, the higher the recommendation coefficient corresponding to the recommended operation parameters is. A correspondence relationship between the recommendation coefficient and the effect score and the energy consumption information may be set in advance. Based on the above correspondence relationship, the recommendation coefficient corresponding to the recommended operation parameters may be determined. For more explanations about the energy consumption information, please refer to the related descriptions of FIG. 4.

In some embodiments, a training process of the recommended operation parameter prediction model includes obtaining a second training sample and a second label. The second training sample may be obtained based on the gas quality condition parameter and the purification parameter of the raw gas in an actual purification process, the second label is at least one group of actual operation parameters and an actual effect score corresponding to the at least one group of actual operation parameters corresponding to the second training sample, and the second label may be obtained by manual labeling.

In some embodiments, the same gas quality condition parameters may actually correspond to at least one group of actual operation parameters, so a group of second training samples may correspond to at least one second label. The actual effect score may be determined based on an effect produced by the actual operation parameters, for example, the actual effect score may be determined based on the actual hydrogen sulfide content in the gas obtained after a desulfurization process.

The smart gas device management platform may input the second training sample and the second label into an initial recommended operation parameter prediction model, and determine a prediction result of the at least one group of recommended operation parameters and at least one effect score. A loss function may be determined based on the prediction result of the at least one group of recommended operation parameters and the at least one effect score and the second label. The smart gas device management platform may update the parameter of the initial recommended operation parameter prediction model based on the loss function until the training ends when the preset condition is met. The preset condition may be that the loss function converges, a number of iterations reaches a threshold, etc.

In some embodiments, the smart gas device management platform may determine the operation parameter 340 in the purification process based on the at least one group of recommended operation parameters and the at least one recommendation coefficient. For example, the smart gas device management platform may determine the recommended operation parameter with the largest recommendation coefficient as the operation parameter.

In some embodiments, for each group of the recommended operation parameters, the smart gas device management platform may predict the energy consumption information in the purification process corresponding to each group of the recommended operation parameters, and determine a target operation parameter based on the energy consumption information and the recommendation coefficient corresponding to each group of recommended operation parameters. For more contents on the energy consumption information and the target operation coefficient, please refer to FIG. 4 and/or FIG. 5 and the related descriptions thereof.

Through the recommended operation parameter prediction model, at least one group of recommended operation parameters and the corresponding effect score may be predicted, and then the recommendation coefficient corresponding to the at least one group of recommended operation parameters may be determined, which is used to further determine the final operation parameter in the purification process, so that the finally obtained operation parameter can be optimal, thereby improving an overall gas purification effect.

Figure 4:
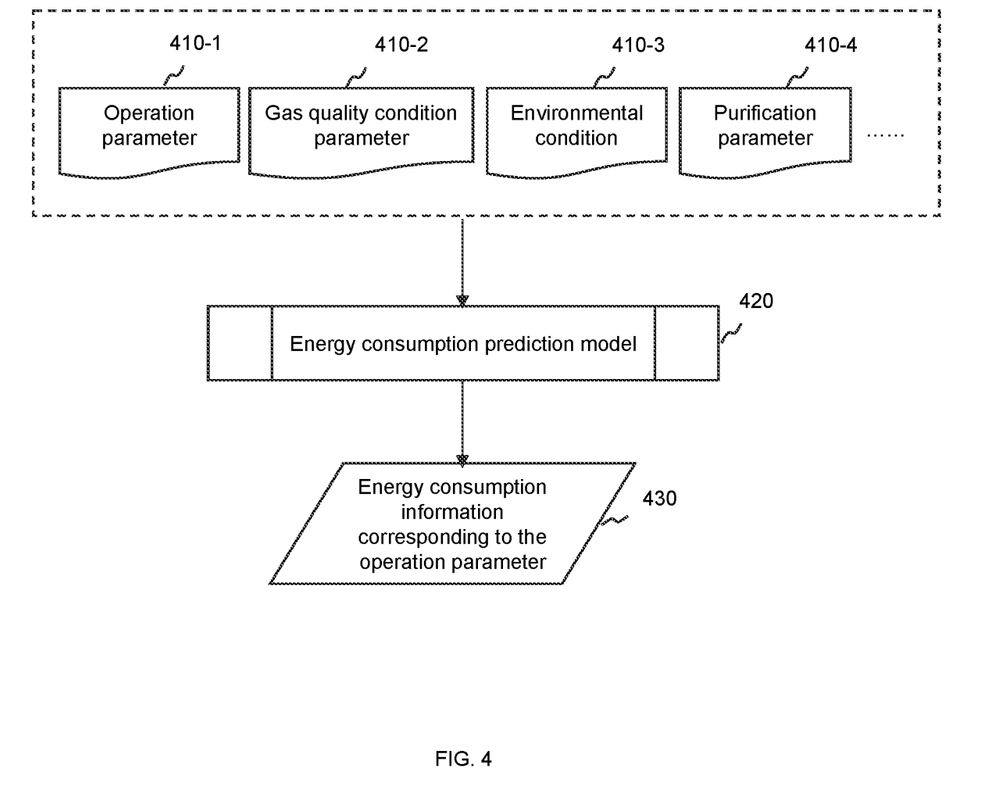
FIG. 4 is a schematic diagram illustrating an exemplary energy consumption prediction model according to some embodiments of the present disclosure.

FIG. 4 is a schematic diagram illustrating an exemplary energy consumption prediction model according to some embodiments of the present disclosure.

In some embodiments, a smart gas device management platform may predict energy consumption information corresponding to an operation parameter based on the operation parameter.

The energy consumption information may refer to the energy consumed by the purification operation based on the operation parameter. The energy consumption information may include power consumption, material consumption, etc. The power consumption may include the power consumption of a gas purification device participating in the purification process, for example, the power consumption of the gas purification device such as an amine liquid circulating pump and an absorption tower. The material consumption may include a solvent consumption for the purification operation, e.g., amine liquid consumption, etc. In some embodiments, the energy consumption information may include the power consumption, and the material consumption, etc. within a certain time period. For example, the energy consumption information may include the power consumption and the material consumption, etc. in a week or a month. The energy consumption information may further include the power consumption per unit and the material consumption per unit, etc., for example, the average power consumption and the average material consumption per hour or per day, etc. Exemplarily, the energy consumption information corresponding to a certain operation parameter may include that the power consumption in a week is 200 kwh, the material consumption in a week is 100 $m^3$, or the power consumption per unit is 1.2 kwh, and the material consumption per unit is 0.6 $m^3/h$.

In some embodiments, the energy consumption information may further be related to an amine liquid circulation volume.

The amine liquid circulation volume refers to the circulation volume of a weakly basic organic amine solvent used to absorb the hydrogen sulfide or the carbon dioxide per unit of time in the purification process. Therefore, the greater the amine liquid circulation volume is, the greater the volume of the organic amine solvent used circularly per unit of time is, that is, the greater the material consumption per unit of time is. At the same time, the greater the amine liquid circulation volume is, the greater the working power of the amine liquid circulating pump is, that is, the greater the power consumption per unit of time is. For more contents of the amine liquid circulation volume, please refer to the related descriptions of FIG. 2.

In some embodiments of the present disclosure, based on a relationship between the energy consumption information and the amine liquid circulation volume, factors affecting the energy consumption information can be considered more comprehensively, thereby making the prediction of the energy consumption information more accurate.

In some embodiments, the smart gas device management platform may predict the energy consumption information corresponding to the operation parameter in various feasible ways based on the operation parameter. In some embodiments, the smart gas device management platform may obtain the energy consumption information corresponding to the operation parameter by setting a comparison relationship in advance. For example, a comparison table between the operation parameter and the energy consumption information may be manually set in advance, and the corresponding energy consumption information may be obtained by checking the table based on the operation parameter.

In some embodiments, the smart gas device management platform may obtain the energy consumption information corresponding to the operation parameter through an energy consumption prediction model.

In some embodiments, the energy consumption prediction model may be configured to predict energy consumption information corresponding to the operation parameter. The energy consumption prediction model may be a machine learning model. In some embodiments, the energy consumption prediction model may include any one or a combination of various feasible models such as a recurrent neural network model, a deep neural network model, and a convolutional neural network model.

As shown in FIG. 4, an input of the energy consumption prediction model 420 may include an operation parameter 410-1, a gas quality condition parameter 410-2, an environmental condition 410-3, a purification parameter 410-4, etc., and an output of the energy consumption prediction model 420 may include energy consumption information 430 corresponding to the operation parameter. The environmental condition may include a condition like a location and a temperature of the environment where the gas device is located. For definitions and descriptions of the operation parameter, the gas quality condition parameter and the purification parameter, please refer to FIG. 2, FIG. 3 and the related contents thereof.

In some embodiments, the energy consumption prediction model may be obtained through a model training. The smart gas device management platform may train an energy consumption prediction model based on a plurality of groups of third training samples with third labels. The smart gas device management platform may input the third training sample with the third label into the energy consumption prediction model, and update the parameter of the energy consumption prediction model through training. The third training sample may include a sample operation parameter, a sample gas quality condition parameter, a sample environmental condition, and a sample purification parameter in an actual purification process. The third training sample may be derived from historical data. The third label of the third training sample may be the actual energy consumption information in the actual purification process. In some embodiments, the third label may be derived from the historical data, e.g., the third label may be obtained based on a historical reading of a power meter. In some embodiments, the third label may further be manually labeled.

During the training process, the smart gas device management platform may train the energy consumption prediction model in various feasible ways. For example, a loss function may be constructed from the third label and the output of the initial energy consumption prediction model, and the parameter of the energy consumption prediction model may be iteratively updated through a gradient descent or other ways based on the loss function. When the preset condition is met, the model training is completed, and a trained energy consumption prediction model is obtained. The preset condition may be that the loss function converges, the number of iterations reaches a threshold, etc.

Through obtaining the energy consumption information based on a processing on the operation parameter, the gas quality condition parameter, the environmental condition and the purification parameter by the energy consumption prediction model, the relevant factors affecting the purification energy consumption can be fully considered, so that the obtained energy consumption information can be more accurate. Meanwhile, a calculation amount can be reduced, and an efficiency of predicting the energy consumption information can be improved.

In some embodiments, the energy consumption prediction model may further be configured to predict the energy consumption information corresponding to the recommended operation parameter. The smart gas device management platform may further determine the operation parameter in the purification process from the at least one group of the recommended operation parameters based on the at least one group of the recommended operation parameters and the at least one energy consumption information obtained by prediction corresponding to the at least one group of the recommended operation parameters. For the specific descriptions of the above content, please refer to the related content of FIG. 5.

Obtaining the energy consumption information corresponding to the recommended operation parameter through the energy consumption prediction model may more accurately obtain the different energy consumption information corresponding to different recommended operation parameters, and then, under a purification requirement is met, the recommended parameter with the lowest energy consumption can be selected for purification based on the energy consumption information, thereby reducing an energy waste and improving an energy usage ratio.

In some embodiments of the present disclosure, through predicting the energy consumption information corresponding to the operation parameter based on the operation parameter, the energy consumption in the purification process may be estimated and determined before the purification operation is performed, so as to facilitate to coordinate a purification scheme, an energy storage, other aspects based on the energy consumption in the purification process for better performing the purification operation.

Figure 5:
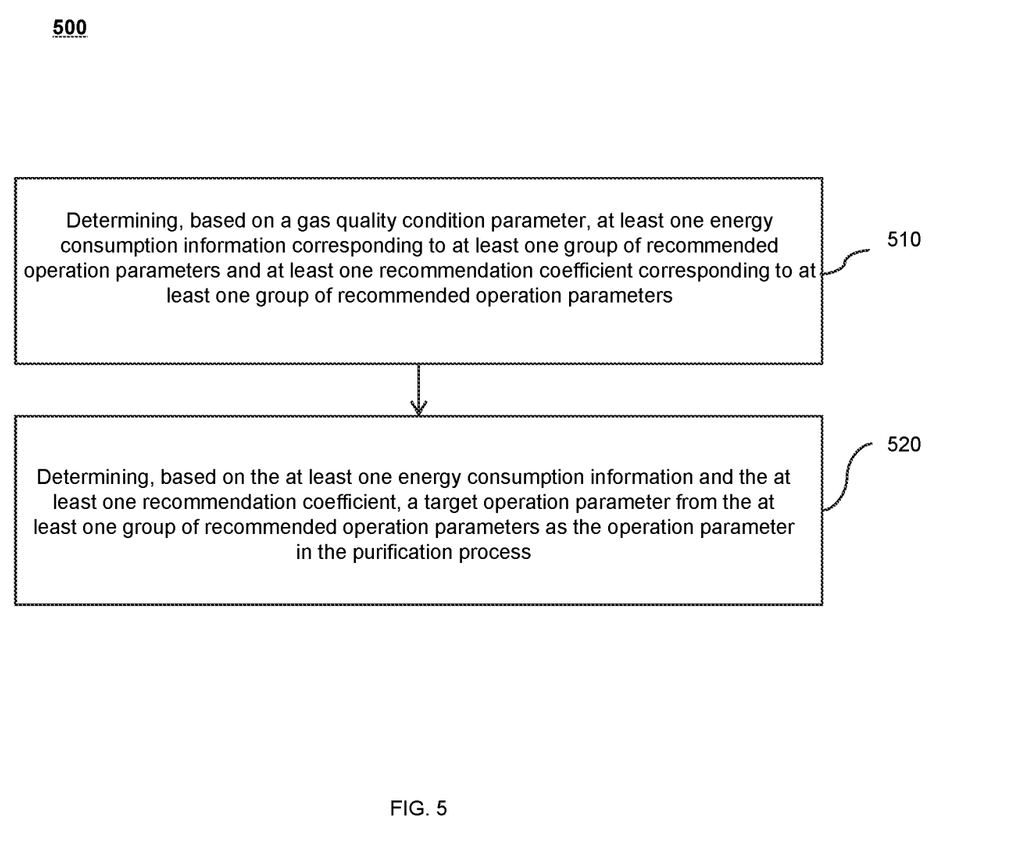
FIG. 5 is a flowchart illustrating an exemplary process of determining a target operation parameter according to some embodiments of the present disclosure.

FIG. 5 is a flowchart illustrating an exemplary process of determining a target operation parameter according to some embodiments of the present disclosure. As shown in FIG. 5, process 500 includes the following operations. In some embodiments, the process 500 may be performed by a smart gas device management platform.

Step 510, determining, based on a gas quality condition parameter, at least one energy consumption information corresponding to at least one group of recommended operation parameters and at least one recommendation coefficient corresponding to the at least one group of recommended operation parameters.

In some embodiments, the smart gas device management platform may predict the at least one group of recommended operation parameters and the corresponding recommendation coefficients through a recommended operation parameter prediction model based on the gas quality condition parameter. For more details about predicting the corresponding recommendation coefficient through the recommended operation parameter prediction model, please refer to FIG. 3 and related descriptions thereof.

In some embodiments, for each group of recommended operation parameters, the smart gas device management platform may predict the corresponding energy consumption information through an energy consumption prediction model. More information about the energy consumption prediction model may be found in FIG. 4 and the related descriptions thereof.

Step 520, determining, based on the at least one energy consumption information and the at least one recommendation coefficient, a target operation parameter from the at least one group of recommended operation parameters as the operation parameter in the purification process.

In some embodiments, for each group of recommended operation parameters, the smart gas device management platform may form a final score value based on the corresponding energy consumption information and recommendation coefficient of each group of recommended operation parameters. In some embodiments, the smart gas device management platform may take the group of recommended operation parameters with the highest score value as the target operation parameter.

Exemplarily, the score value may equal to $W1 \times$recommendation coefficient$+W2 \times \log$ (1/energy consumption information), where $W1$ indicates a weight of the recommendation coefficient, and $W2$ indicates a weight of the energy consumption information. In some embodiments, the energy consumption information may include power consumption and material consumption. For a method for determining the energy consumption information, please refer to FIG. 4 and related descriptions thereof. In some embodiments, the weights of W1 and W2 may be related to a power price. For example, when the power price is higher, W2 may be greater than W1; when the power price is lower, W1 may be greater than W2.

Determining the target operation parameter from the at least one group of recommended operation parameters through the energy consumption information and the recommendation coefficient can not only achieve a better purification effect in the purification process, but also reduce the energy consumption and a purification cost.

The basic concepts have been described above. Obviously, for those skilled in the art, the above detailed disclosure is merely an example, and does not constitute a limitation of the present disclosure. Although not explicitly described herein, various modifications, improvements, and corrections to the present disclosure may be made by those skilled in the art. Such modifications, improvements, and corrections are suggested in the present disclosure, so they still belong to the spirit and scope of the exemplary embodiments of the present disclosure.

Similarly, it should be noted that, in order to simplify the expressions disclosed in the present disclosure and thus help the understanding of one or more embodiments of the present disclosure, in the foregoing description of the embodiments of the present disclosure, various features may sometimes be combined into one embodiment, one drawing, or the descriptions thereof. However, this way of disclosure does not imply that the subject matter of the description requires more features than are recited in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other variations are also possible within the scope of the present disclosure. Accordingly, by way of example and not limitation, alternative configurations of the embodiments of the present disclosure may be considered consistent with the guidance of the present disclosure. Accordingly, the embodiments of the present disclosure are not limited to those expressly introduced and described in the present disclosure.

What is claimed is:

1. A method for gas purification management in a storage and distribution station, wherein
   the method is implemented based on an Internet of Things (IOT) system, and the IoT system includes a smart gas user platform, a smart gas service platform, a smart gas sensor network platform, a smart gas object platform, and a smart gas device management platform; wherein
   the smart gas service platform is configured to send an operation parameter to the smart gas user platform;
   the smart gas object platform is configured to obtain a gas quality condition parameter of a raw gas, and transmit the gas quality condition parameter of the raw gas to the smart gas device management platform through the smart gas sensor network platform;
   the method for gas purification management in a storage and distribution station is performed by a processor of the smart gas device management platform, the method comprising:
   obtaining the gas quality condition parameter of the raw gas, the gas quality condition parameter being obtained based on the storage and distribution station; wherein the gas quality condition parameter at least includes at least one of a hydrogen sulfide content, a carbon dioxide content, and a target purification volume;
   predicting, based on the at least one of the hydrogen sulfide content, the carbon dioxide content, and the target purification volume, at least one group of recommended operation parameters and at least one effect score corresponding to the at least one group of recommended operation parameters through a recommended operation parameter prediction model, wherein the recommended operation parameter prediction model is a machine learning model obtained through a training process, comprising:
   generating a second training sample and a second label, wherein the second training sample is obtained based on the gas quality condition parameter and a purification parameter of the raw gas in an actual purification process, and the second label is an actual operation parameter and an actual effect score corresponding to the second training sample;
   inputting the second training sample and the second label into an initial recommended operation parameter prediction model to determine a prediction result of recommended operation parameter and effect score;
   determining a loss function based on the prediction result of the recommended operation parameter and effect score and the second label;
   updating the initial recommended operation parameter prediction model based on the loss function;
   obtaining the recommended operation parameter prediction model until the initial operation parameter prediction model meets preset conditions;
   determining, based on the at least one effect score and at least one energy consumption information, at least one recommendation coefficient corresponding to the at least one group of recommended operation parameters;
   determining, based on the at least one group of recommended operation parameters and the at least one recommendation coefficient, the operation parameter in a purification process; wherein the operation parameter is used for a purification operation of the raw gas, the operation parameter includes at least one of an amine liquid circulation volume, an absorption tower temperature, and an amine liquid feeding location, and the energy consumption information is determined through a process including:
   predicting, based on the operation parameter, the energy consumption information corresponding to the operation parameter through an energy consumption prediction model, an input of the energy consumption prediction model including the operation parameter, the gas quality condition parameter, an environmental condition and a purification parameter, and an output of the energy consumption prediction model including the energy consumption information corresponding to the operation parameter, wherein the environmental condition includes a position and a temperature of the environment where the gas device is located, and the purification parameter includes a purification type, a gas purification device type, and a purification standard in a purification process;
   generating, based on the operation parameter, a remote control instruction and sending the remote control instruction to the smart gas sensor network platform; and
   sending, based on the smart gas sensor network platform, the remote control instruction to the smart gas object platform for controlling a gas purification device performing the purification operation.

2. The method of claim 1, wherein in the IoT system for gas purification management in the storage and distribution station, the smart gas user platform includes a gas user sub-platform, a government user sub-platform, and a supervision user sub-platform;
the smart gas service platform includes a smart gas consumption service sub-platform, a smart operation service sub-platform, and a smart supervision service sub-platform;
the smart gas device management platform includes a smart gas indoor device management sub-platform, a smart gas pipeline network device management sub-platform, and a smart gas data center;
the smart gas sensor network platform includes a smart gas indoor device sensor network sub-platform and a smart gas pipeline network device sensor network sub-platform; and
the smart gas object platform includes a smart gas indoor device object sub-platform and a smart gas pipeline network device object sub-platform.

3. The method of claim 1, wherein the determining, based on the at least one group of recommended operation parameters and the at least one recommendation coefficient, an operation parameter in a purification process includes:
determining, based on the gas quality condition parameter, at least one energy consumption information corresponding to at least one group of recommended operation parameters and at least one recommendation coefficient corresponding to the at least one group of recommended operation parameters; and
determining, based on the at least one energy consumption information and the at least one recommendation coefficient, a target operation parameter from the at least one group of recommended operation parameters as the operation parameter in the purification process.

4. An Internet of Things (IOT) system for gas purification management in a storage and distribution station, comprising: a smart gas user platform, a smart gas service platform, a smart gas device management platform, a smart gas sensor network platform, and a smart gas object platform, wherein the smart gas service platform is configured to send an operation parameter to the smart gas user platform;
the smart gas object platform is configured to obtain a gas quality condition parameter of a raw gas, and transmit the gas quality condition parameter of the raw gas to the smart gas device management platform through the smart gas sensor network platform, wherein the gas quality condition parameter at least includes a hydrogen sulfide content, a carbon dioxide content, and a target purification volume of the raw gas;
the smart gas device management platform is configured to:
predict, based on the at least one of the hydrogen sulfide content, the carbon dioxide content, and the target purification volume, at least one group of recommended operation parameters and at least one effect score corresponding to the at least one group of recommended operation parameters through a recommended operation parameter prediction model, wherein the recommended operation parameter prediction model is a machine learning model obtained through a training process, comprising:
generating a second training sample and a second label, wherein the second training sample is obtained based on the gas quality condition parameter and a purification parameter of the raw gas in an actual purification process, and the second label is an actual operation parameter and an actual effect score corresponding to the second training sample;
inputting the second training sample and the second label into an initial recommended operation parameter prediction model to determine a prediction result of recommended operation parameter and effect score;
determining a loss function based on the prediction result of the recommended operation parameter and effect score and the second label;
updating the initial recommended operation parameter prediction model based on the loss function;
obtaining the recommended operation parameter prediction model until the initial operation parameter prediction model meets preset conditions;
determine, based on the at least one effect score and at least one energy consumption information, at least one recommendation coefficient corresponding to the at least one group of recommended operation parameters;
determine, based on the at least one group of recommended operation parameters and the at least one recommendation coefficient, the operation parameter in a purification process; wherein the operation parameter is used for a purification operation of the raw gas, the operation parameter includes at least one of an amine liquid circulation volume, an absorption tower temperature, and an amine liquid feeding location, determining the energy consumption information comprises:
predicting, based on an energy prediction model, the energy consumption information corresponding to the operation parameter through an energy consumption prediction model, an input of the energy consumption prediction model including the operation parameter, the gas quality condition parameter, an environment condition and a purification parameter, and an output including a position, a temperature of the environment where the gas device is located, the purification parameter including a purification type, a gas purification device type, and a purification standard in a purification process;
generate, based on the operation parameter, a remote control instruction and send the remote control instruction to the smart gas sensor network platform; and
the smart gas sensor network platform is configured to send the remote control instruction to the smart gas object platform for controlling a gas purification device performing the purification operation.

* * * * *